W. S. Buck,
Soldering Clamp.

N°60,994.  Patented Jan. 8, 1867.

Witnesses:
Edward Brown
Stanley P. Kelton

Inventor:
Walter S. Buck.

United States Patent Office.

WALTER S. BUCK, OF PHILADELPHIA, PENNSYLVANIA.

Letters Patent No. 60,994, dated January 8, 1867.

IMPROVED MACHINE FOR MAKING TIN CANS.

*The Schedule referred to in these Letters Patent and making part of the same.*

TO ALL WHOM IT MAY CONCERN:

Be it known that I, WALTER S. BUCK, of the city and county of Philadelphia, and State of Pennsylvania, have invented a new and improved Machine for Making Tin Cans; and I do hereby declare the following is a full, clear, and exact description thereof, reference being had to the accompanying drawings, and the letters of reference marked thereon.

The object of my invention is to facilitate the soldering of tin cans, such as are used in preserving fruit. It consists of a machine having secured to it an expanding cylinder upon which the body of the can is closely wrapped and there held by a blade, which is brought in contact with the seam by the pressure of the foot on a treadle. The tinman then plumbs the seam with a soldering iron.

To enable others skilled in the art to make and use my invention, I will proceed to decribe its construction and operation.

Figure 2:
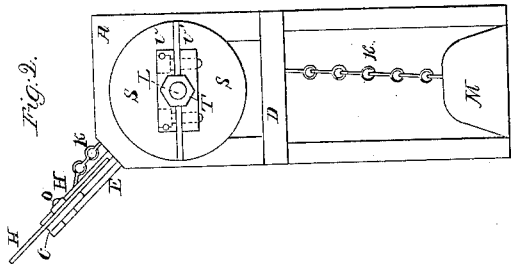
Figure 1:
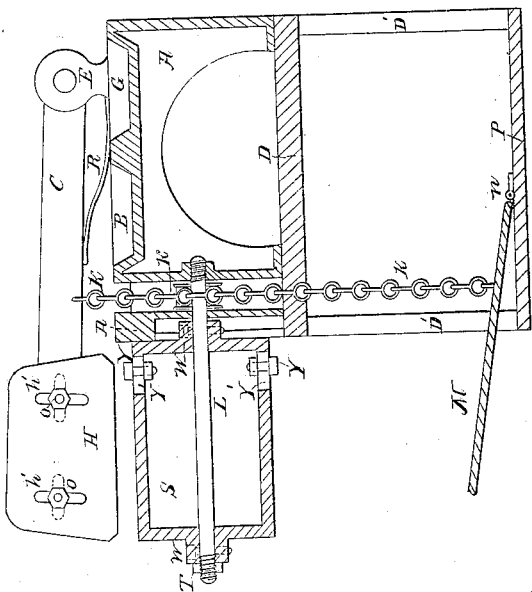

Figure 1 is a section through my machine.
Figure 2 is an end view.
Figure 4 is a detached part.
Similar letters in each refer to the same parts.

Figure 3:
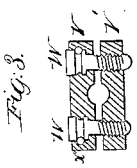

A is a cast-iron base-plate. Into one end of it is screwed or bolted the centre-pin L. In the upper face of this plate are cast two pans, one for rosin, G, and one for drops, B. D represents the work-bench, with its legs, D'; and to this bench is bolted fast the base-plate A. An ear, E, is either bolted to the base-plate A or cast solid with it, and answers as a fulcrum for the arm C, carrying at its opposite end the broad and thin blade H. This blade has two perpendicular slots, $h'$, cut in it, and the arm C has two corresponding horizontal slots. Two bolts, $o$, pass through these slots and hold the blade H firmly to the arm C. A chain, K, is hooked on to arm C, and passes downward through an opening cast in the base-plate A, and over a small pulley-wheel, K', and down to the treadle M, which said treadle vibrates on a hinge, $n$, fixed to the floor P. The pulley-wheel K' runs upon the centre-pin L, and directs the pull of the chain K in a direct line with the motion of the arm C. As soon as the foot is taken from the treadle M the arm C is raised by a spring, R. S is a cast-iron expanding cylinder or block, which fits on the pin L, and is secured there by a nut, T. This cylinder is made hollow and in two halves, and at each end lugs, V and V', are cast on. The bottom lug V' is tapped for two screws, and the top lug V is countersunk for the screw-heads, (see fig. 3.) These screw-heads W W have a groove cut in, and after the bolts W are in place a pin, X, is driven into the groove. By turning these screws with a screw-driver the block S may be slightly enlarged or contracted. Y Y are two bolts sliding in longitudinal slots, $y'$. These can be tightened in their proper positions and serve as guides to push the tin up to in soldering it. These cylinders are made of different sizes, according to the number of sizes of cans which are made.

To use the machine, put the proper sized cylinder on the pin L, and adjust the guides $y$ to the right length of can; then wrap the tin tightly round the block S, (and having adjusted the blade H so that its edge fits well in contact with the line of the can,) bring the blade H down upon it by the pressure of the foot upon the treadle M, and hold it there firmly until the soldering is effected.

I do not claim simply the holding of the tin to be soldered between a cylindrical block and a knife-blade; but I claim—

1. The cast-iron base-plate A, with its recesses B and G, in combination with the steady-pin L, for the purpose substantially as described.
2. The expanding metallic cylinder S, when constructed and adjusted substantially as described.
3. The combination of the slotted blade H with the slotted and vibrating arm C and set-screws O, arranged and operating as described.
4. I claim the sliding guides $y$, in combination with the cylinder S, substantially as described.
5. I claim the combination of the presser arm C, base-plate A, and expanding cylinder S, when arranged and operating for the purpose substantially as described.

WALTER S. BUCK.

Witnesses:
  EDWARD BROWN,
  STANLEY C. HYLTON.